(12) United States Patent
Peev

(10) Patent No.: US 9,398,109 B2
(45) Date of Patent: Jul. 19, 2016

(54) SYSTEM, MESSAGING BROKER AND METHOD FOR MANAGING COMMUNICATION BETWEEN OPEN SERVICES GATEWAY INITIATIVE (OSGI) ENVIRONMENTS

(71) Applicant: Software AG, Darmstadt (DE)

(72) Inventor: Peter Peev, Sofia (BG)

(73) Assignee: SOFTWARE AG, Darmstadt (DE)

( * ) Notice: Subject to any disclaimer, the term of this patent is extended or adjusted under 35 U.S.C. 154(b) by 721 days.

(21) Appl. No.: 13/782,426

(22) Filed: Mar. 1, 2013

(65) Prior Publication Data

US 2014/0181233 A1 Jun. 26, 2014

(30) Foreign Application Priority Data

Dec. 21, 2012 (EP) .................................... 12198923

(51) Int. Cl.
*H04L 29/08* (2006.01)
*G06F 9/54* (2006.01)
*H04L 29/06* (2006.01)

(52) U.S. Cl.
CPC .............. *H04L 67/2809* (2013.01); *G06F 9/54* (2013.01); *G06F 9/546* (2013.01); *H04L 63/1416* (2013.01); *H04L 67/125* (2013.01); *H04L 67/2842* (2013.01)

(58) Field of Classification Search
CPC .............. H04L 63/102; H04L 63/1441; H04L 65/1026; H04L 12/2803; H04L 12/2832; H04L 67/12; H04L 67/125; H04L 67/16; H04L 67/2809; H04L 67/2842; H04L 63/0823; H04L 63/1416; H04L 12/2814; G06F 9/46; G06F 9/54; G06F 9/546
See application file for complete search history.

(56) References Cited

U.S. PATENT DOCUMENTS

| | | | | |
|---|---|---|---|---|
| 8,055,802 B2* | 11/2011 | Choi | ................... | H04L 12/2803 370/395.54 |
| 8,375,110 B2* | 2/2013 | Jung | ....................... | H04L 67/16 709/217 |
| 2002/0129264 A1* | 9/2002 | Rowland | ............... | H04L 63/102 726/26 |
| 2005/0144262 A1* | 6/2005 | Kang | .................. | H04L 12/2805 709/220 |
| 2005/0154785 A1 | 7/2005 | Reed et al. | | |

(Continued)

FOREIGN PATENT DOCUMENTS

| | | |
|---|---|---|
| EP | 1 898 345 | 3/2008 |
| EP | 2 088 741 | 8/2009 |
| EP | 2088741 | 12/2009 |

OTHER PUBLICATIONS

O'Day, Ben, "OSGi Bundle COmmunication Options", Jul. 28, 2012, DZone, https://dzone.com/articles/osgi-bundle-communication , accessed Mar. 15, 2016.*

(Continued)

*Primary Examiner* — Ramy M Osman
(74) *Attorney, Agent, or Firm* — Nixon & Vanderhye P.C.

(57) ABSTRACT

Certain example embodiments relate to techniques for managing communication between a plurality of Open Services Gateway initiative (OSGi) environments. A system includes a messaging broker configured to receive a message from one of the OSGi environments, with the message including a call of a service provided by one of the other OSGi environments. The broker may be further configured to transfer the message to the other OSGi environment. The plural OSGi environments communicate only via the messaging broker.

18 Claims, 4 Drawing Sheets

(56) References Cited

U.S. PATENT DOCUMENTS

Figure 1:
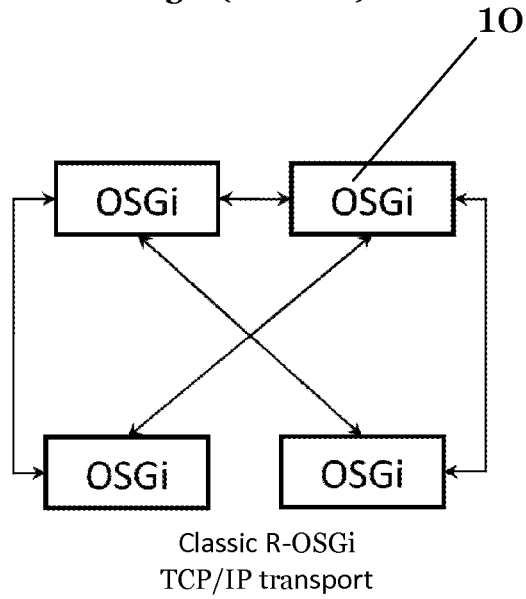

| | | | |
|---|---|---|---|
| 2005/0195390 A1* | 9/2005 | Jeon | G06F 11/3688 356/237.2 |
| 2006/0155850 A1* | 7/2006 | Ma | H04L 29/06027 709/226 |
| 2006/0159110 A1* | 7/2006 | Choi | H04L 12/2803 370/401 |
| 2007/0083618 A1* | 4/2007 | Kim | G06F 9/465 709/218 |
| 2008/0172674 A1* | 7/2008 | Yee | G06F 9/5038 718/106 |
| 2008/0205419 A1* | 8/2008 | Shin | H04L 12/2818 370/401 |
| 2008/0256225 A1* | 10/2008 | Suh | H04L 67/125 709/223 |
| 2010/0037057 A1* | 2/2010 | Shim | H04L 63/0823 713/171 |
| 2012/0036252 A1 | 2/2012 | Shi et al. | |
| 2012/0246316 A1 | 9/2012 | Ramu et al. | |

OTHER PUBLICATIONS

M. Psiuk et al., "Distributed OSGi Built Over Message-Oriented Middleware," Software—Practice and Experience, Softw. Pract. Exper. 2013 43:1-31, Dec. 8, 2011.

E. Curry, "Message-Oriented Middleware," in Middleware for Communications (Q. Mahmoud, ed.), Jan. 2004, XP007911233 (14 pages).

D. Donsez, et al., "Propagation d'événements entre passerelles OSGi," Sep. 22, 2006 (2 pages with partial English translation).

A. Koschel, et al., "Asynchronous Messaging for OSGi," Proceeding of the ITI 2012 34$^{th}$ Int. Conf. on Information Technology Interfaces, Jun. 25-28, 2012, pp. 99-104.

Gelibert, A., et al., "Clustering OSGi Applications Using Distributed Shared Memory," IEEE, May 9, 2011.

Adler, M. et al., "Endberich: Clouds—Peerbasiertes On-Demand Computing", 84 pages, (Mar. 31, 2010), with English-translation, 87 pages.

Rellermeyer, J.S. et al., "Services Everywhere : OSGi in Distributed Environments", Eclipsecon 2007, (Mar. 5-8, 2007), 9 pages.

Gelibert, A. et al., "OSGi Applications Clustering using Distributed Shared Memory", 11$^{TH}$ Annual Conference on New Technologies of Distributed System, 25 pages, printed Mar. 1, 2013.

Gelibert, A. et al., "Clustering OSGi Applications using Distributed Shared Memory", 8 pages, printed Mar. 1, 2013.

OSGi Alliance, "OSGi Service Platform", (Jun. 5, 2012), 11 pages.

Office Action issued in U.S. Appl. No. 13/872,413 dated Jan. 30, 2015.

M. Psiuk et al., "Distributed OSGi Built Over Message-Oriented Middleware," Software—Practice and Experience Softw. Pract. Exper. 2013 43:1-31, Dec. 8, 2011.

E. Curry, "Message-Oriented Middleware," in Middleware for Commmunications (Q. Mahmoud, ed.), Jan. 2004, XP007911233.

A. Koschel, et al., "Asynchronous Messaging for OSGi," Proceedings of the ITI 2012 34$^{th}$ Int. Conf. on Information Technology Interfaces, Jun. 25-28, 2012, pp. 99-104.

Gelibert, A., et al., "Clustering OSGi Applications Using Distributed Shared Memory," IEEE, May 9, 2011 (8 pages).

U.S. Appl. No. 13/872,413, filed Apr. 29, 2013; Shanmugasundaram et al.

Wikipedia, "Service-oriented architecture", 20 pages, printed on Apr. 26, 2013.

Wikipedia, "SOA Governance", 3 pages, printed on Apr. 26, 2013.

* cited by examiner

Classic R-OSGi
TCP/IP transport

TS R-OSGi
transport

SYSTEM, MESSAGING BROKER AND METHOD FOR MANAGING COMMUNICATION BETWEEN OPEN SERVICES GATEWAY INITIATIVE (OSGI) ENVIRONMENTS

This application claims priority to EP Application No. 12 198 923.0, filed Dec. 21, 2012, the entire contents of which is hereby incorporated by reference.

1. TECHNICAL FIELD

Certain example embodiments relate to a system for managing communication between a plurality of Open Services Gateway initiative (OSGi) environments, as well as to a corresponding messaging broker and method.

2. BACKGROUND AND SUMMARY

Nowadays, complex computing tasks are typically processed by complex software programs, wherein such software is typically organized in multiple modules, each being in charge of a certain processing. One way of implementing such a system in the programming language Java is provided by a dynamic and modularized architecture model called OSGi (Open Services Gateway initiative; cf. http://en.wikipedia.org/wiki/OSGi). OSGi is a module system and service platform for the Java programming language implementing functional components in the form of bundles and services in an OSGi environment. OSGi services are Java object instances, registered into the OSGi framework. Any Java object can be registered as a service, but typically it implements a well-known interface. OSGi bundles can be used to group one or more OSGi services and are typically specified as jar components with extra manifest headers. The functional components (i.e. bundles and services) are typically managed using a service registry of the respective OSGi environment. Accordingly, using OSGi technology, a given software program can be better structured into distinct bundles and services which invoke each other during runtime. Still, a given OSGi environment is a self-contained system running within one instance of a Java Virtual Machine (JVM) on a single computer.

Along with the increasing demand on processing power, it is however desirable that complex processing tasks are executed in a physically distributed computing system, in which multiple OSGi environments communicate with each other. In other words, it is oftentimes desired that one given OSGi environment is enabled to call services provided by another, i.e. remote, OSGi environment (which might be located on the same computer, but also on a different computer connected over a network, such as the Internet). High throughput data (e.g. a huge amount of messages) typically has to be communicated in such distributed systems in a reasonable time frame. Referring to the internet network example above, an OSGi system has to be accordingly distributed to different OSGi environments. It is indispensable to manage the communication of messages in such a OSGi network (or distributed system) in a usable and effectively high throughput manner.

The OSGi platform provides a solution for distributed environments, namely Remote OSGi (R-OSGi) services. In the publication "Services Everywhere: OSGi in Distributed Environments" of Rellermeyer et al. (cf. http://people.inf.ethz.ch/rjan/publications/rellermeyer_eclipsecono7.pdf) the basic design principles of R-OSGi, such as transparent service access, interaction, internal structures and techniques used in R-OSGi are disclosed. Typically each R-OSGi comprises a TCP-Channel for one-to-one TCP connection with another R-OSGi.

In this prior art approach and system (hereinafter also referred to as "Classic R-OSGi TCP/IP transport") the network comprises OSGi environments as nodes, preferably Remote OSGi (illustrated in FIG. 1 and disclosed in the publication of Rellermeyer et al.), and messages are communicated between the nodes via TCP connections as edges.

As shown in FIG. 1, in this classical system for managing communication between a plurality of Open Services Gateway initiative (OSGi) environments, each OSGi environment has to be connected to all other OSGi environments leading to an exponential number of connections (one-to-one TCP connection). This is particularly disadvantageous, since this architecture not only requires vast amounts of network communication, but also since each participating OSGi environment has to keep track of which other OSGi environments are available within the network. One further disadvantage arises when a new OSGi environment is added to the network. In this case, connections to all the other OSGi environments have to be set up. Another disadvantage is the requirement to use multicast (or multiplexed broadcast) connections. Although the standard R-OSGi technology is based on multicast, multicast is typically forbidden on most networks. For example, multicast does not work in many cloud environments, which is a limiting factor.

Therefore, those skilled in the art will appreciate that managing communication in huge OSGi networks is a complex and difficult task, while severe effects can arise if the data transfer does not work as expected.

EP patent application publication no. 2088741 A1 discloses a method and OSGi bundle for sharing a local service on an embedded device. Further it is disclosed that the embedded device comprises communication means for communication between connected devices. For example a home network comprising a plurality of interconnected devices is mentioned in this application publication. This method can be applied on service frameworks, comprising OSGi. Certain communication protocols e.g. used by R-OSGi can be integrated.

Further the publication "Clustering OSGi Applications using Distributed Shared Memory" of Gelibert at al. (http://en.youscribe.com/catalogue/reports-and-theses/professional-resources/it-systems/clustering-osgi-applications-using-distributed-shared-memory-1693585) discloses an approach for integrating a distributed shared memory (DSM). DSM is integrated into the OSGi service platform for the distribution and clustering of OSGi services.

However, while the above-discussed prior art systems and approaches allow for a distribution of systems and communicating messages using R-OSGi, the proposed prior art approached still lack the important ability of managing the data transfer of messages efficiently.

It is therefore the technical problem underlying certain example embodiments to provide a system for managing communication between a plurality of Open Services Gateway initiative (OSGi) environments in such a manner that communication can be managed efficiently in terms of reduction of connections, network traffic and management effort, thereby at least partly overcoming the above explained disadvantages of the prior art.

This problem is according to one aspect solved by a system for managing communication between a plurality of Open Services Gateway initiative (OSGi) environments. In the embodiment of claim 1, the system comprises:

a. a messaging broker, adapted for receiving a message from one of the OSGi environments, wherein the message comprises a call of a service provided by one of the other OSGi environments, and further adapted for transferring the message to the other OSGi environment;

b. wherein the plurality of OSGi environments communicate only via the messaging broker.

Accordingly, the embodiment defines a distributed OSGi system or network with a plurality of interconnected OSGi environments. Importantly the system for managing communication between OSGi environments comprises an additional messaging broker as central system component. The messaging broker is adapted to receive messages from the OSGi environments and to transfer a received message to the intended other OSGi environment(s). Such messages may comprise a call of a service provided by one of the other OSGi environments. Importantly, the prior art disadvantage of one-to-one connections between the OSGi environments is overcome this way by allowing the connection and/or communication among the individual OSGi environments only via the messaging broker. This reduces the number of interconnections to a great extent and enables a faster data transfer in a high throughput fashion.

In another aspect, the messaging broker is adapted for receiving a register request from an OSGi environment to register with the message broker. In response to the register request, the messaging broker may be adapted for providing a unique identifier to the requesting OSGi environment. Accordingly, the OSGi environment(s) may have to register themselves with the messaging broker before sending messages to the messaging broker. Therefore the messaging broker is adapted to receive register requests from the OSGi environments. The OSGi environments can be registered by a unique identifier and/or other features for registration by the messaging broker. This registration may be one possibility to control the management of communicating messages in that for example just registered OSGi environments may be allowed to send messages to the messaging broker and new OSGi environments can be detected upon sending a request to the messaging broker. In other words, having the messaging broker act as a central registration point in the distributed system serves to maintain control about which and/or how many OSGi environment(s) are currently participating in the system at any time.

In yet another aspect, in response to the registering of an OSGi environment, the messaging broker is adapted for notifying all other OSGi environments. Accordingly, the messaging broker is adapted to notify all other OSGi environments if a new OSGi environment has been registered. This notification assures that the other OSGi environments are always up to date, i.e. each OSGi environment always knows which other OSGi environments are currently available within the system. More precisely, the OSGi environments can be informed which OSGi environments are registered and/or these registered OSGi environments can be used for interconnection and/or communicating messages.

Accordingly, the above-mentioned aspects of enabling OSGi environments to register with the messaging broker and to be notified of other OSGi environments essentially establishes an efficient publish/subscribe mechanism. This is another fundamental difference over the point-to-point communication employed in the prior art approach discussed in the introductory part above.

In one aspect, the OSGi environments are adapted for transmitting, via the message broker, a message comprising a list of provided services to at least one other OSGi environment. As mentioned in the introductory part further above, OSGi environments typically comprise at least one service, i.e. a certain well-defined processing component which can invoke other services. In order for one OSGi environment to know which services are provided by other OSGi environments, the OSGi environments may send each other a message which comprises a list of provided services. This message is preferably sent by a given OSGi environment after the OSGi environment has registered with the messaging broker.

In a further aspect, the system comprises an inbox cache for each OSGi environment, wherein the inbox cache is adapted for storing messages comprising a call of a service provided by the respective OSGi environment. Additionally or alternatively, in response to a notification that a new OSGi environment is registered with the messaging broker, each OSGi environment may be adapted for creating an outbox cache for the new OSGi environment, wherein the outbox cache is adapted for storing messages comprising a call of a service provided by the new OSGi environment. Accordingly, cache technology can be advantageously incorporated in the system of certain example embodiments. Two types of caches can be considered, namely an inbox and/or outbox cache. The inbox cache of a given OSGi environment can be applied for storing messages that are directed to that OSGi environment, i.e. messages comprising a call of a service provided by the respective OSGi environment. Further, when a first OSGi environment has set-up an outbox cache for a second OSGi environment, when the first OSGi environment intends to send a message to the second OSGi environment, it simply places the message into the respective outbox cache. It will be appreciated that using the provided cache technology is particularly advantageous, since each OSGi environment simply has to place its messages into the corresponding cache, while the actual transport from the source OSGi environment to the target OSGi environment is handled by the messaging broker, i.e. completely transparent to the involved OSGi environments.

It will be appreciated that the terms "inbox cache" and "outbox cache" are to be understood broadly, in that they only indicate the intended direction in which the respective cache is used. The person skilled in the art will appreciate that alternative terms such as "input buffer"/"output buffer" or "send buffer"/"receive buffer" could similarly be used.

Various embodiments based on cache technology can be considered. For example, the inbox cache and the outbox cache(s) may be stored locally on a computing system of the respective OSGi environment. Alternatively, the inbox cache and the outbox cache associated with a particular OSGi environment may be stored in a single cache, which is preferably stored on the messaging broker.

In a preferred aspect, one of the OSGi environments is adapted for placing a message comprising a call of a service provided by another OSGi environment into an outbox cache associated with the other OSGi environment, wherein the messaging broker is adapted for transferring the message from the outbox cache associated with the other OSGi environment to an inbox cache of the other OSGi environment, and wherein the messaging broker is adapted for notifying the other OSGi environment of the new message in the inbox cache. Accordingly, the messaging broker is adapted for efficiently and reliably transferring messages between the OSGi environments. Cache technology can be applied for data transfer in placing a message, comprising a call of a service provided by another OSGi environment into an outbox cache associated with the other OSGi environment: The messaging broker is in this case adapted for transferring the message from the outbox cache associated with the other OSGi environment to an inbox cache of the other OSGi environment. In addition the messaging broker is adapted for notifying the other OSGi environment of the new message in the inbox cache, so that the other OSGi environment can pick up the message and process the service call included therein.

In another aspect, the messaging broker is adapted for sending received messages to a monitoring component, thereby enabling a central recording, analysis and/or replaying of the communication between the plurality of OSGi environments. Accordingly, the messaging broker is in this aspect not just in charge of the data transfer between the OSGi environments, but is also be adapted for sending communicated messages to a monitoring component. This additional feature allows for an analysis and/or even replaying of the communication between the plurality of OSGi environments. Analysis may comprise the information (e.g. comparable to a log) of failed and/or correct communication. Thereby the e.g. failure can be reproduced and repeated.

Certain example embodiments are also related to a system, wherein the functionality of the messaging broker is implemented by a Terracotta cache server (TS), i.e. a server based on the Terracotta products of applicant and/or a server using Java Message Service (JMS), and/or wherein the plurality of OSGi environments communicate using Remote Services for OSGi (R-OSGi). Applicant has found that by using the Terracotta Server of applicant for managing communication the best results are achieved in connection with certain example embodiments in respect to identifying and/or registering and/or limiting OSGi environments. However, the provided messaging broker functionality can be implemented by any suitable server product, cache server and/or technology, such as e.g. JMS. Further, the OSGi environments can be implemented as R-OSGi objects for remote communication.

Further, certain example embodiments provide a method for managing communication between a plurality of Open Services Gateway initiative (OSGi) environments in accordance with any of the above described systems.

Lastly, certain example embodiments also provide a computer program comprising instructions for implementing any of the above described methods.

3. SHORT DESCRIPTION OF THE DRAWINGS

In the following detailed description, presently preferred embodiments are further described with reference to the following figures:

FIG. 1: A schematic representation of a system for communicating messages between multiple OSGi environments in accordance with the prior art.

Figure 2:
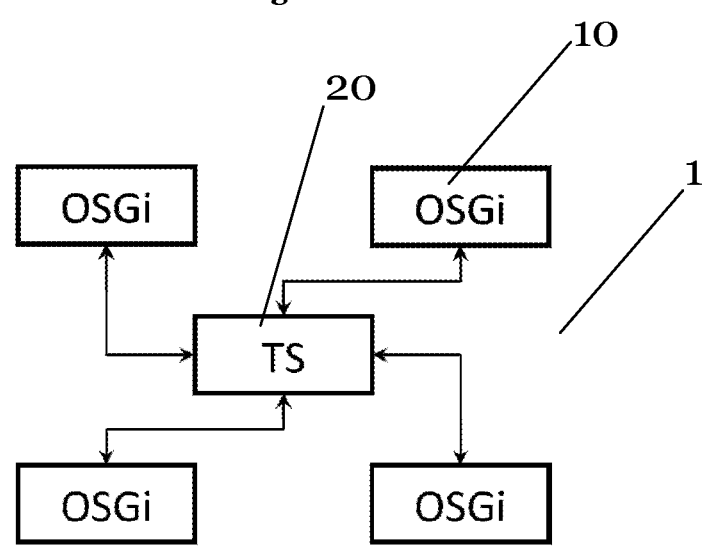

FIG. 2: A schematic representation of a system for communicating messages between multiple OSGi environments, comprising a Messaging Broker as central system component in accordance with one embodiment.

Figure 3:
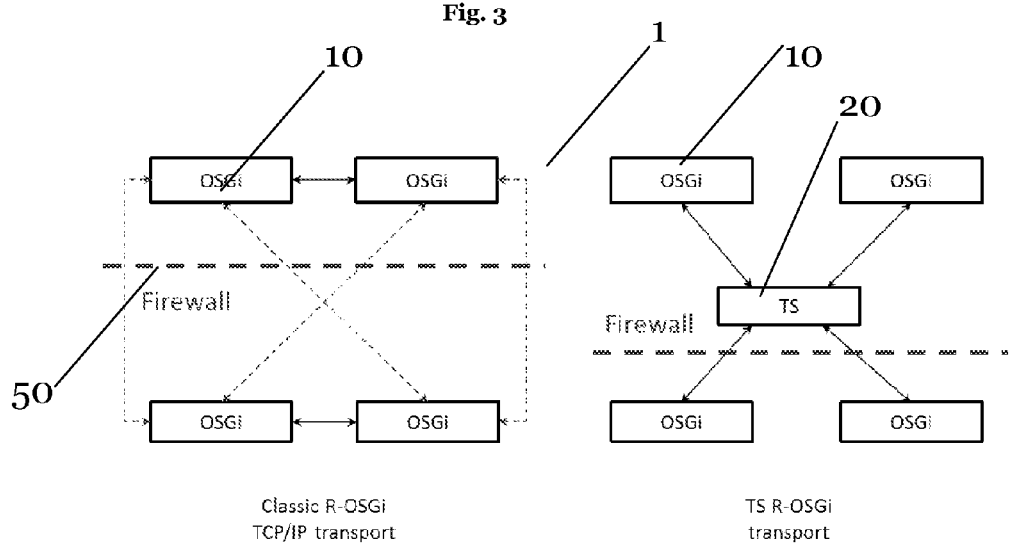

FIG. 3: A schematic representation of a simplified comparison of two contrary systems and approaches for communicating at least one message in networks with incorporation of a firewall in accordance with one embodiment.

Figure 4:
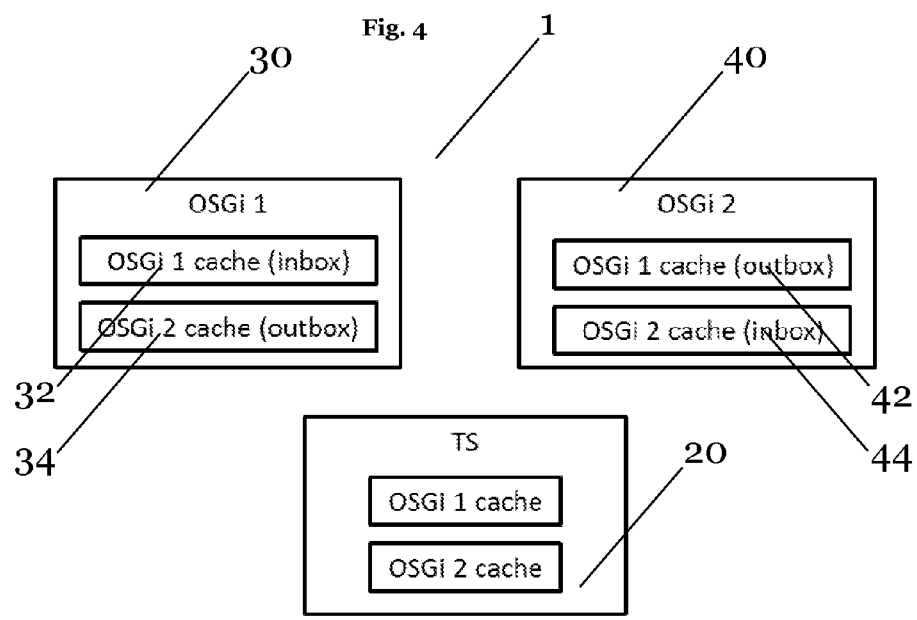

FIG. 4: An exemplary organization of the at least two general nodes and the Messaging broker in the network incorporating cache technology in accordance with one embodiment.

Figure 5:
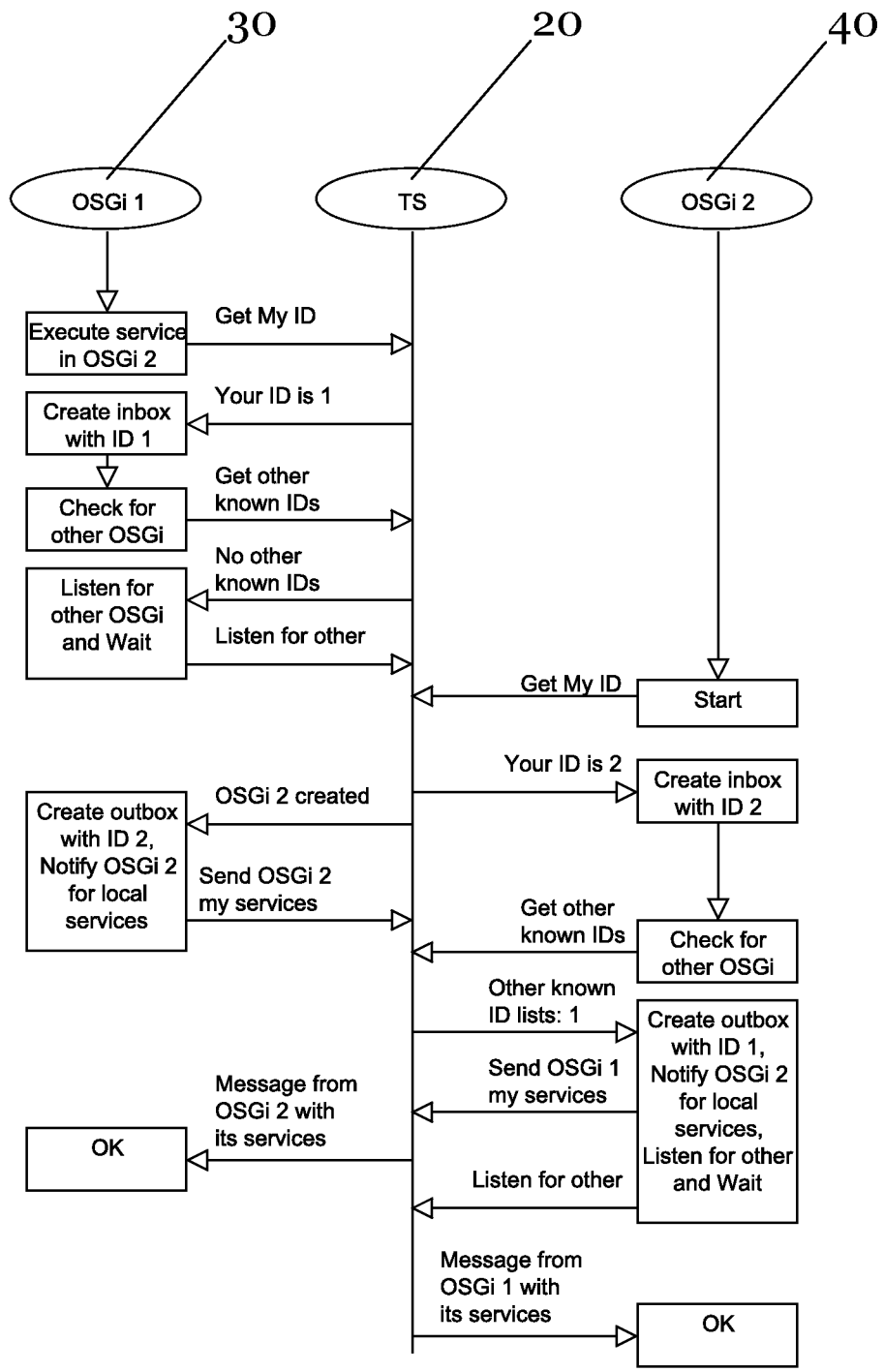

FIG. 5: A schematic flow diagram for connecting nodes in the network in accordance with one embodiment.

Figure 6:
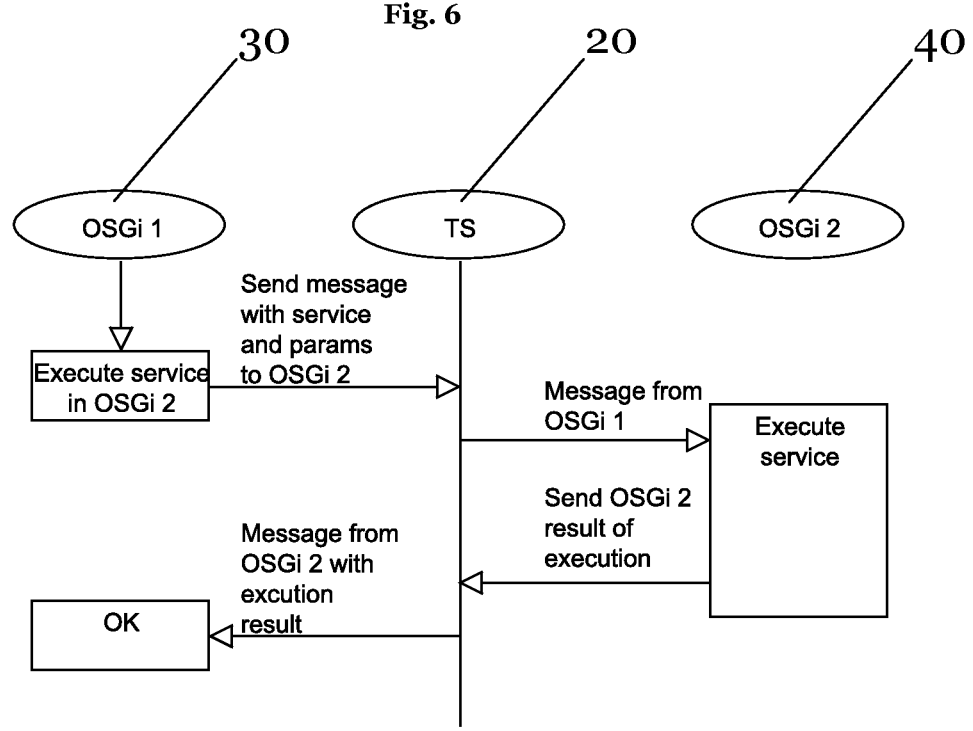

FIG. 6: A schematic flow diagram for executing the communication of the at least one message between the at least two general nodes in the network in accordance with one embodiment.

4. DETAILED DESCRIPTION

Overview: Systems for Communicating Messages in Networks

In the following, a presently preferred embodiment is described with respect to a comparison of two distributed systems for communicating messages schematically shown in FIG. 1 and FIG. 2. Explicitly, the classical system known from prior art (FIG. 1, hereinafter also referred to as "Classic R-OSGi TCP/IP transport") is compared to the system 1 of certain example embodiments (FIG. 2, hereinafter also referred to as "TS R-OSGi transport"). Both systems, as shown in FIG. 1 and FIG. 2, depict in general a network with multiple OSGi environments employing R-OSGi as nodes and connections there between as edges. The major differences of the two systems are explained in accordance with FIG. 1 and FIG. 2 in the following listing:

1. In the prior art approach and system "Classic R-OSGi TCP/IP transport" each OSGi runtime (R-OSGi) 10 is connected to all other OSGi runtimes 10 in the illustrated network (FIG. 1). Contrary, in the system "TS R-OSGi transport", each OSGi runtime 10 is connected only to a central messaging broker 20 (FIG. 2). In a preferred implementation, said messaging broker 20 is a Terracotta cache server (TS) of applicant. However, it will be appreciated that certain example embodiments and the following description are not limited to the Terracotta embodiment, but that any suitable server technology can be used for the messaging broker 20.

The topology of network connections in the network 1 results in a difference of the number of (TCP/IP) connections: in the prior art approach, it is exponential with respect to the amount of OSGi environments involved (FIG. 1), whereas in certain example embodiments, the amount of network connections is linear due to the central messaging broker 20 (FIG. 2).

2. In the approach "Classic R-OSGi TCP/IP transport" the environment has to find somehow all existing runtimes 10 and create a connection to each one, if a new OSGi runtime 10 is added (FIG. 1). In contrast, in certain example embodiments each OSGi environment 10 needs to know only the location of TS 20 and everything else is handled automatically (FIG. 2). For example, in the "Classic R-OSGi" approach, the implementation should send broadcast messages to find all existing R-OSGi environments and has to handle the responses to add them in an internal list and then start connecting (with error handling) to each environment individually. Certain example embodiments, in contrast, make a connection to the messaging broker (preferably a Terracotta server (TS)) and the broker/server tells it everything it needs to know about other participants and in addition notifies other participants that a new environment has arrived in the landscape.

Security Aspects

In another embodiment, security aspects are considered. In FIG. 3 at least one firewall 50 is integrated in the networks (previously illustrated in FIG. 1 and FIG. 2) highlighting one security aspect.

Adding at least one firewall 50 to nodes in the network typically breaks every classical protocol for discovery, because they are typically based on multicast and multicast is disabled or forbidden on most networks 1 (and dropped by routers), specifically in cloud environments.

Preferably, using "TS R-OSGi transport" according to certain example embodiments, each node can be put behind a firewall 50 and only one open port configuration for the TS firewall 50 will enable proper operation.

Another security aspect is adding at least one encryption and/or signature on the at least one message. Any kind of encryption and/or signature for passed messages can be dynamically added on top of the transport. Currently, the terracotta protocol has no notion of security of any kind—no SSL/encryption, no authentication, no authorization, meaning that anybody can connect to the R-OSGi 10 message cache and listen what is going on. The same limitation is also valid for the R-OSGi 10 TCP/IP protocol. Depending on the actual implementation of the additional security it can be applied only to specific nodes and/or specific message types.

If there is a need for authentication, the R-OSGi 10 protocol can be extended with an authentication message and handler in certain example embodiments.

Preferred Implementation

FIG. 4 illustrates two exemplary general nodes, i.e. OSGi environments (OSGi 1 and OSGi 2) 30, 40 and the messaging Broker (TS) 20 as components of the network incorporating a number of caches 32, 34, 42, 44 as one preferred embodiment. In this embodiment, the functionality of the messaging broker 20 is implemented by a cache server, such as the Terracotta cache server of applicant. It should be appreciated that any other suitable cache server could be used. Therefore, the terms "messaging broker" and "cache server" are used as synonyms in the following.

Generally, a cache as a technology is based on the concept to keep certain data inside the memory (as the fastest way to access data) to speed up operations in expense of memory used. In this case, a given OSGi service sees messages as local memory data and does not care how the cache server is handling or transporting it. In fact, what happens in a preferred embodiment is that some code places some data inside the cache, which is all it has to do. From that point on, the cache server is taking care to see that there is new data, to transport it to other interested parties on that data and notify them that there is new/modified/removed data from their own local memory cache, so that they can act accordingly. So, when something goes inside cache 32 that same data "magically" appears (thanks to the cache server) in cache 42, as if they are one and the same cache. In the preferred embodiment, shared caches are provided, i.e. caches that share the same data between different OSGi environments (i.e. their respective JVMs), so that code on two different systems works with the same data all the time. This concept of a shared cache is shown in FIG. 4, where three different OSGi environments (JVMs) 30, 40 and 20 see the same data in the OSGi 1 cache and OSGi 2 cache, respectively. That is, while the caches are depicted in FIG. 1 as separate entities within the environments 30, 40 and 20, this represents only how different code interprets the cache data. For example with respect to the "OSGi 1 cache", for the environment 30 it is an inbox 32, while for the other environment 40 it is an outbox 42 and they handle these inboxes/outboxes differently, but the data is the same. Also the cache server sees (and preferably stores) the same data, just that it is not interested in the data, but only in keeping the data in sync between the environments 30 and 40 and in notifying each environment for changes.

The steps for connecting the nodes are listed in the following and are accordingly shown in FIG. 5 as an exemplary flow diagram:

1. Initially, the OSGi environment 30 (OSGi 1 in FIG. 4) starts.
2. The OSGi environment 30 (OSGi 1) asks the cache server 20 for a unique identifier (ID). In the depicted example, the cache server 20 returns the ID "1".
3. The OSGi environment 30 (OSGi 1) creates a shared cache 32 (cf. FIG. 4) for its inbox.
4. The OSGi environment 30 (OSGi 1) asks the cache server 20 for other R-OSGi members (at this point, none are present in the depicted example).
5. The OSGi environment 30 (OSGi 1) goes to sleep.
6. The OSGi environment 40 (OSGi 2) starts.
7. The OSGi environment 40 (OSGi 2) asks the cache server 20 for its ID (in this case 2).
8. The OSGi environment 40 (OSGi 2) creates a shared cache 44 for its inbox.
9. The OSGi environment 30 (OSGi 1) receives an event "OSGi with ID 2 connected", i.e. the cache server 20 informs the OSGi environment 30 (OSGi 1) that another environment, in this case OSGi environment 40 (OSGi 2) has started and registered with the cache server 20.
10. The OSGi environment 30 (OSGi 1) creates a shared cache 34 for a respective OSGi 2 outbox. This outbox cache 34 allows the OSGi environment 30 to send messages to the OSGi environment 40, as will be explained in more detail further below.
11. The OSGi environment 30 (OSGi 1) places a message with OSGi 1 remote services in the OSGi 2 message box 34. In other words, said messages comprises a list of the services which are provided by the OSGi environment 30 and which are allowed to be remotely called by other OSGi environments, such as the OSGi environment 40. This way, by reading said message, the OSGi environment 40 is able to learn which services are provided by the OSGi environment 30.
12. The OSGi environment 40 (OSGi 2) asks the cache server 20 for other R-OSGi members (at this point OSGi 1).
13. The OSGi environment 40 (OSGi 2) creates a shared cache 42 for a respective OSGi 1 outbox. The cache server 20 returns the already created cache OSGi 1. For example, let's say the code of OSGi environment 30 (OSGi 1) creates a cache with a specific name (e.g. "cache1") and it is connected to the cache server 20. If now the other OSGi environment 40 (OSGi 2) tries to create a cache with the same name (in this case "cache1"), the cache server 20 will detect the intention to create said second cache, and will not only create the cache, but will also fill it with the data that is currently residing inside as it was last modified by OSGi environment 30 (OSGi 1).
14. The OSGi environment 40 (OSGi 2) places a message with OSGi 2 remote services in the OSGi 1 message box 42.
15. The cache server 20 transports the message from step 11 to the OSGi environment 40 (OSGi 2), more precisely to its inbox cache 44, and notifies the OSGi environment 40 (OSGi 2).
16. The OSGi environment 40 (OSGi 2) receives the notification from the cache server 20 for the message in the OSGi 2 cache 44, reads it (removes it from cache 44) and populates local services with remote (OSGi 1) ones. That is, the data in the message that is received contains enough data to create a local representation of the remote services and to inform other code inside the OSGi environment that such services are available and they can start invoking the remote services as if they were local (similar to how a proxy is working).
17. The cache server 20 transports the message from step 14 to the OSGi environment 30 (OSGi 1), more precisely to its inbox cache 32 and notifies the OSGi environment 30 (OSGi 1).
18. The OSGi environment 30 (OSGi 1) receives the notification from the cache server 20 for the message in the OSGi 1 cache 32, reads it (removes it from cache 32) and populates local services with remote (OSGi 2) ones.

Accordingly, at this point in time, two OSGi environments 30 and 40 have successfully registered with the central messaging broker/cache server 20 and have exchanged their lists of provided services, so that they are able to remotely call services of the other OSGi environment. It will be appreciated that although the explained example involves only two OSGi environments for the sake of simplicity, certain example embodiments support any number of OSGi environments.

The steps for the execution of the actual message exchange (i.e. the remote service invocation) are listed in the following and are accordingly shown in FIG. 6 as an exemplary flow diagram:

1. The OSGi environment 30 (OSGi 1) code calls a remote service provided by the OSGi environment 40 (OSGi 2).
2. To this end, the OSGi environment 30 (OSGi 1) puts a message in the OSGi 2 outbox cache 34 to execute the respective service.
3. The cache server 20 transports the message from step 2 to the OSGi environment 40 (OSGi 2), more precisely to its inbox cache 44, and notifies the OSGi environment 40 (OSGi 2).
4. The OSGi environment 40 (OSGi 2) receives the notification from the cache server 20 for the message in the OSGi 2 cache 44, reads it (removes it from cache 44) and executes the call for the intended service.
5. After execution of the service, the OSGi environment 40 (OSGi 2) places the result of the service execution into the OSGi 1 outbox cache 42.
6. The cache server 20 transports the message from step 5 to the OSGi environment 30 (OSGi 1), more precisely to its inbox cache 32) and notifies the OSGi environment 30 (OSGi 1).
7. The OSGi environment 30 (OSGi 1) receives the notification from the cache server 20 for the message in the OSGi 1 cache 32, reads it (removes it from cache 32) and invokes a callback waiting for the remote service call to finish (with result or exception).

Preferred Pseudo Code

In a preferred implementation, there are two parts that are providing the link between OSGi runtimes 30, 40—R-OSGi NetworkChannelFactory and R-OSGi NetworkChannel.

```
R-OSGi NetworkChannelFactory:
package com.softwareag.r_osgi.transport.terracotta;
public class TCNetworkChannelFactory implements
    NetworkChannelFactory {
    /**
    * called by OSGi when bundle is started
    */
    private void initializeOSGiBundle( ) {
        // create connection to central Terracotta Server (TS)
        terracottaServer = connectToTerracottaServer( );
        // ask TS for unique ID of this connection
        id = terracottaServer.getMvID( );
        // create shared cache for this ID in this OSGi and TS
        // TS will notify us if there are messages for us
        // from other OSGi runtimes, so that we can handle them
        createLocalInboxCache(id);
    }
    /**
    * called by OSGi when bundle is stopped
    */
    private void deactivateBundle( ) {
        // clean up
        removeAllCaches( );
    }
    /**
    * called by R-OSGi when it finds the protocol we registered
    */
    public void activateFromROSGi( ) {
        // tell TS to notify us when another OSGi is coming and going
        terracottaServer.addListenerForOtherNodes( );
        // get a list of all other OSGi runtimes (their IDs) from TS
        List otherActiveNodes =
            terracottaServer.getOtherActiveNodes( );
        // create outbox shared cache for every other connected OSGi
runtime
        // when we put something in that cache, other OSGi runtime
        // will be notified we have something for it
        terracottaServer.createCacheForEachOtherNode( );
    }
    /**
    * called by R-OSGi to create a connection to other OSGi runtime
    * @param node
    * @return transport channel
    */
    public NetworkChannel connectToNode(ROSGiNode node) {
        // create a connection between us and other OSGi runtime
        // this means that we have 2 caches:
        // 1. our inbox (created in initialize)
        // 2. other OSGi outbox (it is inbox for the other OSGi)
        TCNetworkChannel nc = new TCNetworkChannel(node);
        // tell other OSGi what remote services we have
        node.connect( );
        return nc;
    }
}
R-OSGi NetworkChannel:
package com.softwareag.r_osgi.transport.terracotta;
class TCNetworkChannel implements NetworkChannel {
    /**
    * called to connect to a remote OSGi runtime
    * @param node
    */
    public void connect(ROSGiNode node) {
        // create shared cache for other OSGi and TS
        // at this point we have copy of the messages in cache in:
        // OSGi 1, TS and OSGi 2
        terracottaServer.createOutboxCacheForNode(node);
        // tell TS to notify us if there are messages for us
        // from the other OSGi runtime, so that we can handle them
        terracottaServer.addListenerForMessagesFromNode(new
    ROSGiMessageListener ( ){
            public void
    handleNotifiicationForNewMessageInInbox( ) {
                // tell TS to give us the message sent for us
                ROSGiMessage message =
    terracottaServer.getMessage( );
                // handle message (execute service)
                rOSGi.handleMessage(message):
                // tell TS to remove the message
                // it will expire and disappear,
                // but anyway, just for sure and to keep memory
    low
                terracottaServer.removeMessage(message):
            }
        });
    }
    /**
    * called to disconnect from remote OSGi runtime
    */
    public void close( ) throws IOException {
        // cleanup. destroy cache,
        // because we do not want to talk to that OSGi anymore
        terracottaServer.removeOutboxCacheForCurrentNode( ):
    }
    /**
    * called to send message to remote OSGi runtime
    */
    public void sendMessage(RemoteOSGiMessage message) {
        // tell TS to send a message to other OSGi
        // runtime (execute a remote service)
        terracottaServer.putMessageInOutboxCacheForCurrentNode(message);
    }
}
```

Implementation Decisions

In the preferred implementation of certain example embodiments, a Terracotta Server is used as the messaging broker 20, but actually any kind of Messaging Broker 20 like JMS can be applied. It would need additional implementation for finding connected nodes in order to establish uniqueness of the IDs of OSGi runtimes (in case of a JMS type of broker). Other brokers 20 may need other specific implementation details, but the idea of certain example embodiments can be considered—exemplary, use asynchronous message based communication based on publish/subscribe mechanism and/or routed through central server. Specifically, the biggest problem is identifying each subscriber with a unique ID accessible by every other subscriber (so that every subscriber is able to get a list of all other subscribers and is able to differentiate them by some kind of ID). The message broker should also notify subscribers that some other subscriber has unsubscribed to prevent further communication to it from other subscribers. In the preferred embodiment, the messaging broker/cache server automatically creates unique IDs for all participating clients. Also, the notification mechanism for new subscribers is handled by the messaging broker/cache server.

In the following, additional details for implementing the present messaging broker/cache server 20 with a Terracotta Server (TS) are provided: TS supports an extended Java caching model, whereby the cache can generally grow "indefinite", i.e. logically larger than the available heap size would provide. The cache is represented by Terracotta Java objects. Using the server variant offers the possibility to share these Java objects across multiple processes or even multiple machines.

Exactly this way, TS can be used as a messaging broker within certain example embodiments. If configured adequately, the cache (i.e. the Java objects) allocated by TS are shared caches. This means when one JVM allocates a certain (named) Java object from Terracotta, this object—when using the same name—will "automatically" appear in another JVM (included all data). This way, the TS hides the transportation of data and the client JVMs just read and write Java objects.

Accordingly, in the scenario described in FIG. 4, the "OSGi 1 cache (inbox)" from process 30 is logically identical with "OSGi 1 cache (outbox)" from process 40. As soon as process 40 writes (i.e. instantiates) this object, the data appears in process 20. If these two processes would run on the same machine, the implementation of this cache would be a system wide shared memory. But it also works when the processes 20 and 40 are on different machines. Also in this case, the TS hides the transferring from the clients in a manner completely transparent to the clients.

In another preferred embodiment, the overall system can be implemented by using only one single cache as inbox and outbox 32, 34, 42, 44 between two OSGi runtimes 30, 40, but it would need additional logic that is not so straightforward to follow and debug. It can be even implemented with one cache for entire landscape of OSGi runtimes 10, but that would add even more complexity to message handling and unnecessary messages to nodes that are not intended recipients meaning additional unnecessary traffic. When the amount of caches would grow in a way that would render this mechanism not performing well, an alternative would be to create a "normal" Send/Receive mechanism, similar to a normal message broker. I.e. the data transportation would not be invisible and has to be taken care of explicitly.

Additional Preferred Embodiments

Another set of advantageous features results from the fact that all communication within the network 1 goes through the messaging broker (TS) 20:
1. In certain example embodiments, the messaging broker (TS) 20 by default may relay all passing data to a backend which enables the unique feature (for R-OSGi 10) of centralizing recording, auditing and/or even replaying of all communication transparent to the attached nodes and without slowing them down.
2. In the "Classic R-OSGi TCP/IP transport" approach a runtime should wait for the communication to be handled on the other side which makes it pretty much synchronous. In certain example embodiments, the messaging broker (TS) 20 protocol OSGi runtime 10 can place data in its local memory cache and is then allowed to continue its operation. The handling of responses can be done when the messaging broker (TS) 20 finishes communication and a response (result or error) is received in the OSGi runtime 10 memory as notification, so that the environment is again working with local memory only. This change converts the communication into an asynchronous one.

There is one very viable alternative for the implementation of the messaging broker 20 as Terracotta cache server of applicant, namely JMS. The disadvantages of JMS compared to Terracotta are listed in the following:
1. JMS cannot limit who is connecting to topics.
2. Clients have to find a way to uniquely generate identifiers to differentiate themselves at runtime 10, so that they can generate messages for proper point-to-point communication which is done automatically by TS 20.
3. Identifying all connected runtimes 10 at initial connect communication, which is done automatically by TS 20.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium. For instance, the example brokers may include or be controlled by at processing resources such as, for example, at least one processor and a memory. The lists, messages, etc., discussed herein may be stored in connection with transitory or non-transitory computer readable storage media. In certain example embodiments, the OSGi Service Gateway Architecture may be leveraged and thus certain example embodiments may include, for example, a hardware level (e.g., including processors, a memory, disk, etc.), an operating system running on the hardware level, the Java Virtual Machine running via the operating system, modules of code that support a life cycle, a service registry, and services, with one or more applications and/or bundles operating across all levels starting with the JVM and with security being provided at the module level and higher.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A messaging computer system for managing communication between different computing nodes of a distributed computing system, where a plurality of Open Services Gateway initiative (OSGi) environments are implemented across the different computing nodes of the distributed computing system such that at least some of the computing nodes have different OSGi environments implemented thereon, the messaging computer system comprising:
 a group of processing resources that include at least one hardware processor, the group of processing resources configured with a messaging broker that is programmed to:
  accept or receive an electronic data message from a first one of the OSGi environments implemented on the distributed computing system, wherein the electronic data message comprises a programmatic service call of a programmatic service provided by a second one of the other OSGi environments that is implemented on a different computing node from the first one of the OSGi environments,
  communicate the electronic data message to the second OSGi environment,
  register a new OSGi environment with the messaging broker in accordance with a received registration request, where an outbox cache associated with each of the plurality of OSGi environments is created for the new OSGi environment, each created outbox cache being configured to store data messages comprising a programmatic service call of a programmatic service provided by the new OSGi environment, wherein each one of the plurality of OSGi environments is associated with a respective inbox cache that stores data messages comprising programmatic service calls for corresponding programmatic services provided by the respective OSGi environment,
 where each outbox and inbox cache is (1) stored with the respective OSGi environment on a corresponding computing node of the distributed computing system, or (2) stored as part of a single cache,
 wherein the plurality of OSGi environments implemented on the distributed computing system communicate with each other only via the messaging broker.

2. The messaging computer system of claim 1, wherein the messaging broker is further programmed to, in response to the received registration request, provide a unique identifier to the new OSGi environment.

3. The messaging computer system of claim 2, wherein in response to registration of the new OSGi environment, the messaging broker is further programmed to transmit a notification of the registration to all other OSGi environments that are implemented in the distributed computing system.

4. The messaging computer system of claim 1, wherein the messaging broker is further programmed to, in accordance with the received registration request, cause the group of processing resources to transmit a notification to all other ones of the plurality of OSGi environments that the new OSGi environment is registered with the message broker.

5. The system of claim 1, wherein the messaging broker is further programmed to:
 accept or receive further electronic data messages from each one of the plurality of OSGi environments that includes a list of provided services for the respective OSGi environment; and
 communicate each one of the lists to at least one other OSGi environment of the plurality of OSGi environments.

6. The messaging computer system of claim 1, wherein each OSGi environment is configured to create an outbox cache for the new OSGi environment in response to reception of a notification that the new OSGi environment is registered with the messaging broker.

7. The messaging computer system of claim 1, wherein the inbox cache and the outbox cache associated with each one of the plurality of OSGi environments is stored on the computing node one which the respective OSGi environment is implemented.

8. The messaging computer system of claim 1, further comprising a storage system that is coupled to the group of processing resources on which the messaging broker is implemented, the storage system configured to store the single cache.

9. The messaging computer system of claim 8, wherein the single cache is stored on the messaging broker.

10. The messaging computer system of claim 1, wherein the accepted or received electronic data message is accepted or received by the first OSGi environment by placing the electronic data message into the outbox cache of the first OSGi environment that is associated with the second OSGi environment
 wherein the messaging broker is further programmed to:
  transfer the electronic data message from the outbox cache of the first OSGi environment that is associated with the second OSGi environment to an inbox cache of the second OSGi environment; and
  notify the second OSGi environment of the transferred electronic data message in the inbox cache.

11. The messaging computer system of claim 1, wherein the messaging broker is configured to send received messages to a monitoring component, which enables a central recording, analysis, and/or replaying of the communication between the plurality of OSGi environments.

12. The messaging computer system of claim 1, wherein functionality of the messaging broker is implemented by a Terracotta cache server and/or a server using Java Message Service (JMS).

13. The messaging computer system of claim 1, wherein the plurality of OSGi environments communicate using Remote Services for OSGi (R-OSGi).

14. A method for managing communication between a plurality of Open Services Gateway initiative (OSGi) environments using a messaging broker computer system that is part of a distributed computing system that includes different computing nodes, where the plurality of OSGi environments are implemented across the different computing nodes of the distributed computing system such that at least some of the computing nodes have different OSGi environments implemented thereon, where each of the plurality of OSGi environments is associated with an inbox cache and an outbox cache, the inbox cache of a corresponding OSGi environment configured to store incoming electronic messages that are routed from another OSGi environment to the corresponding OSGi environment, the outbox cache configured to store outgoing messages from the corresponding OSGi environment that are to be routed to another OSGi environment, the method comprising:

accepting or receiving an electronic data message from a first OSGi environment of the plurality of OSGi environments, wherein the electronic data message comprises a programmatic service call of a programmatic service provided by a second OSGi environment of the plurality of OSGi environments that is implemented on a different computing node from the first OSGi environment, wherein the electronic data message is stored in the outbox cache associated with the first OSGi environment, transferring the electronic data message from the outbox cache associated with the first OSGi environment to the inbox cache associated with the second OSGi environment;

transmitting a message to the second OSGi environment to notify the second OSGi environment that a new electronic data message is in the outbox cache associated with the second OSGi environment, wherein the plurality of OSGi environments implemented on the distributed computing system communicate with each other only via the messaging broker computer system.

15. A non-transitory computer readable storage medium tangibly storing a computer program for use with the messaging broker computer system, the computer program comprising instructions for implementing the method of claim 14.

16. A messaging broker computer system for managing communication between different computing nodes of a distributed computing system, where a plurality of Open Services Gateway initiative (OSGi) environments are implemented across the different computing nodes of the distributed computing system such that at least some of the computing nodes have different OSGi environments implemented thereon, where each of the plurality of OSGi environments is associated with an inbox cache and an outbox cache, the inbox cache of a corresponding OSGi environment configured to store incoming electronic messages that are routed from another OSGi environment to the corresponding OSGi environment, the outbox cache configured to store outgoing messages from the corresponding OSGi environment that are to be routed to another OSGi environment, the messaging computer system comprising:

a processing system that include at least one hardware processor, the processing system configured to:

accept or receive an electronic data message from a first OSGi environment of the plurality of OSGi environments, wherein the electronic data message comprises a programmatic service call of a programmatic service provided by a second OSGi environment of the plurality of OSGi environments that is implemented on a different computing node from the first OSGi environment, wherein the electronic data message is stored in the outbox cache associated with the first OSGi environment, transfer the electronic data message from the outbox cache associated with the first OSGi environment to the inbox cache associated with the second OSGi environment;

transmit a message to the second OSGi environment to notify the second OSGi environment that a new electronic data message is in the outbox cache associated with the second OSGi environment, wherein the plurality of OSGi environments implemented on the distributed computing system communicate with each other only via the messaging broker computer system.

17. The messaging broker computer system of claim 16, further comprising an electronic storage system that is coupled to the processing system, the electronic storage system configured to store each of the inbox and outbox caches associated with the plurality of OSGi environments of the distributed computing system.

18. The messaging broker computer system of claim 16, wherein the inbox and outbox caches associated with the plurality of OSGi environments are respectively stored on the computing node of the respectively associated OSGi environment.

* * * * *